Patented Jan. 12, 1954

2,666,043

UNITED STATES PATENT OFFICE 2,666,043

VULCANIZATION OF RUBBER

Edward L. Carr and George E. P. Smith, Jr., Akron, Ohio, assignors to The Firestone Tire & Rubber Company, Akron, Ohio, a corporation of Ohio No Drawing. Original application March 17, 1951, Serial No. 216,252. Divided and this application March 31, 1952, Serial No. 281,661

9 Claims. (Cl. 260—79.5)

This invention relates to the vulcanization of rubber, and relates especially to a new class of chemical compounds which are valuable accelerators of the vulcanization of rubber or rubber-like substances.

This application is a division of application Serial No. 216,252, filed March 17, 1951, which is a continuation-in-part of application Serial No. 39,380, filed July 17, 1948, now abandoned; the latter application was a continuation-in-part of application Serial No. 488,555, filed May 26, 1943, now Patent No. 2,445,722.

An object of the present invention is to provide a new class of improved rubber vulcanization accelerators of the delayed-action, non-scorching type.

Another object is to provide a method of vulcanizing rubber, whereby scorching or pre-vulcanization during processing of the rubber compound is prevented, but extremely rapid vulcanization is obtained at customary vulcanizing temperatures.

Another object is to provide improved rubber compositions possessing the ability to vulcanize extremely rapidly at ordinary vulcanizing temperatures, but free from any tendency to set-up or pre-vulcanize at rubber processing temperatures.

A further object is to provide vulcanized rubber of improved quality, possessing the characteristics of high modulus and tensile, low hysteresis and a high inherent resistance to deterioration by flexing or aging.

The above and further objects will be manifest in the description of the invention which follows.

It has been found that members of a new class of chemical compounds are very effective in accelerating the vulcanization of natural or synthetic rubber. The new compounds may be conveniently prepared by oxidizing a mixture of 2-mercaptothiazole and a primary amine. The preparative oxidation reaction may be effected by treating a mixture of the mercaptothiazole and an excess of the amine in an alkaline aqueous medium with one of the following oxidizing agents: chlorine, bromine, iodine, hypochlorous acid, hypobromous acid, hypoiodous acid, and alkali metal and alkaline earth metal salts of said acids. The oxidation reaction is believed to comprise the direct action of the oxidizing agent on a mixture of the mercaptothiazole and one equivalent of the amine. The desired substances produced by this oxidation reaction are organic compounds containing nitrogen and sulfur.

The new class of chemical compounds possesses the following type formula:

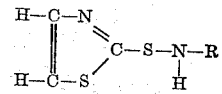

wherein R is an alkyl radical or a cyclo-alkyl radical. Thus, the new compounds are derivatives of sulfenamide (HSNH$_2$). Examples of alkyl and cyclo-alkyl radicals include methyl, ethyl, propyl, butyl, amyl, hexyl, heptyl, octyl, decyl, lauryl, cyclohexyl, methylcyclohexyl, benzyl and similar radicals.

The 2-mercaptothiazole may be prepared from alpha-chloroacetaldehyde and ammonium dithiocarbamate in alcoholic or aqueous solution, in accordance with the following equation:

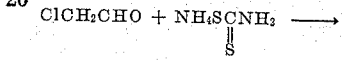
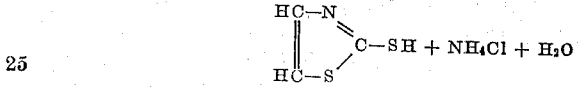

A typical preparation is carried out by gradually adding, with stirring, an alcoholic solution of alpha-chloroacetaldehyde to an alcoholic or aqueous solution of ammonium dithiocarbamate. There is considerable heat of reaction. After the addition is completed, the mixture is stirred until it has cooled to room temperature. Thereafter the solvent is evaporated at room temperature. The thiazole is obtained as a crystalline solid melting at about 80° C. on recrystallizing the reaction residue from water.

An aqueous solution of the mercaptothiazole and an excess of primary amine is oxidized by means of an aqueous sodium hypochlorite solution or the like to produce the new class of sulfenamides in accordance with the following equation:

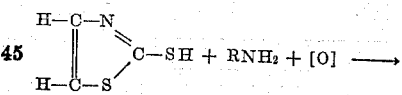

Upon testing the sulfenamides as rubber vulcanization accelerators in the manner described in our Patent No. 2,445,722, they are found to be effective delayed-action accelerators, which are extremely active at normal vulcanizing temperatures of approximately 270–400° F., producing natural and synthetic rubber vulcanizates having high modulus and tensile characteristics and resistance to aging.

Example 1

An aqueous alkaline (sodium hydroxide) solution of 2-mercaptothiazole was mixed with an excess of cyclohexylamine over the amount required by the last-preceding equation, and the mixture was stirred during the gradual addition thereto of an aqueous solution containing about 10% of iodine and about 10% of potassium iodide. The solid reaction product, N-cyclohexyl-2-thiazole sulfenamide,

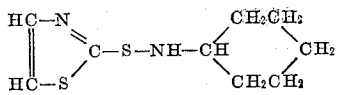

was separated and recrystallized from petroleum ether. The purified product melted at 52–53° C. and analyzed as follows:

Calculated for $C_9H_{14}S_2N_2$ ___ N, 13.08%; S, 29.9%
Found _____ N, 13.07%; S, 29.7%

Example 2

In a similar manner isopropylamine was condensed with 2 - mercaptothiazole to produce N-isopropyl-2-thiazole sulfenamide,

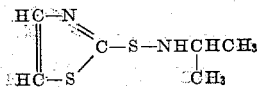

as a liquid product. This product was purified by isolation in ether solution, followed by thorough washing of the ether solution with water, drying this washed solution and then removing the ether therefrom by evaporation under a vacuum.

Example 3

Primary secondary - amylamine (2 - pentylamine) was reacted with 2-mercaptothiazole by the method of Example 1 to produce N-sec-amyl-2-thiazole sulfenamide,

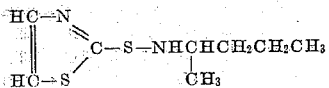

This sulfenamide was a liquid, and was purified as was the product of Example 2.

The sulfenamides of Examples 1 and 3 were tested as rubber vulcanization accelerators by comparing them with 2-mercaptothiazole in the following rubber formula:

| Ingredients | Parts by weight |
| --- | --- |
| Rubber (smoked sheets) | 100.00 |
| Sulfur | 3.30 |
| Zinc oxide | 5.00 |
| Stearic acid | 1.10 |
| Accelerator | 0.60 |

Samples of the three rubber composition, so formulated, were heated for 15 and 30 minutes at 140° F. to determine whether or not they possessed any tendency to pre-vulcanize or set-up during processing operations prior to the usual vulcanizing step, and the following physical testing data were obtained:

| Accelerator; cure at 240° F. | Modulus of elasticity in p. s. i. at 600% elongation | | Tensile strength in p. s. i. at break | |
| --- | --- | --- | --- | --- |
| | 15 min. | 30 min. | 15 min. | 30 min. |
| 2-mercaptothiazole | 0 | 150 | 50 | 475 |
| N-cyclohexyl-2-thiazole sulfenamide | 0 | 50 | 0 | 125 |
| N-sec-amyl-2-thiazole sulfenamide | 0 | 50 | 0 | 175 |

It is apparent that the sulfenamides of the invention possessed less tendency to cause pre-vulcanization than did 2-mercaptothiazole, the substance from which the sulfenamides were synthesized. Other samples of the same rubber compositions were heated for 40 and 60 minutes at 280° F. to determine the relative accelerating properties of the respective accelerators, and the following data were obtained:

| Accelerator, cure at 280° | Modulus of elasticity in p. s. i. at 600% elongation | | Tensile strength in p. s. i. at break | |
| --- | --- | --- | --- | --- |
| | 40 min. | 60 min. | 40 min. | 60 min. |
| 2-mercaptothiazole | 900 | 1,025 | 2,625 | 2,800 |
| N-cyclohexyl-2-thiazole sulfenamide | 2,300 | 2,575 | 3,400 | 3,450 |
| N-sec-amyl-2-thiazole sulfenamide | 950 | 1,250 | 2,950 | 3,225 |

The last set of data shows that the sulfenamides of the invention impart higher physical properties to the rubber after a heat treatment comparable to conventional rubber vulcanization practice.

The various members of the new class of chemical compounds are equally effective delayed-action vulcanization accelerators in rubber tread compounds, latex compounds or other conventional types of vulcanizable compounds of rubber, reclaimed rubber, or synthetic rubber, and consistently produce rapid-curing compositions, which in the vulcanized state possess unusually high modulus, tensile and abrasion-resisting properties. The various synthetic rubbers vulcanizable by heating with sulfur are herein considered equivalent to rubber, examples being butadiene polymers, isoprene polymers and various interpolymers of conjugated diolefins and vinyl compounds, such as GR-S (copolymer of butadiene and styrene) and GR-A (copolymer of butadiene and acrylonitrile). Although sulfur has hereinabove been mentioned as the preferred vulcanizing agent, other known vulcanizing agents susceptible to acceleration (such as tetramethylthiuram disulfide, polysulfides of phenols and cresols, diethyl xanthogen disulfide, and other vulcanizing agents of the "sulfur donor" type) are contemplated.

The preferred class of sulfenamide derivatives may be prepared by other methods than those mentioned above. For example, a mixture of 2-mercaptothiazole and a primary amine may be oxidized by hydrogen peroxide or other oxidizing agent. The invention is not limited to derivatives prepared in accordance with any particular method, but includes the preferred class of compounds, however they may have been formed.

In addition to the above-enumerated desirable properties imparted by the new accelerators to rubber compositions, it will be noted that the vulcanized compositions also are highly efficient, having low hysteresis characteristics. When compared to conventionally accelerated vulcanized rubber compositions, the new compositions are found to be unusually resistant to deterioration upon flexing or aging.

Conventional accelerator activators may be employed to an advantage with the new class of accelerators when extremely rapid vulcanization is desired, especially at lower temperatures. Also, the new accelerators may be used in combination with other accelerators, such as a guanidine (e. g., diphenyl guanidine) or a conventional mercaptothiazole derivative (e. g., mercaptobenzothiazole or 2,2'-dithiobis-benzothiazole) or a dithiocarbamate-type accelerator (such as tetramethylthiuram disulfide, or the zinc salts of dimethyl- or diethyl-dithiocarbamic acids), in order to produce rubber compositions having especially rapid or specific vulcanizing properties. Although the new accelerators are usually employed in the proportion of 0.5 to 2.0 parts per 100 parts of rubber, they may be utilized in the range of 0.1 to 10 parts per 100 parts of rubber.

What is claimed is:

1. The method of vulcanizing rubber which includes heating rubber and sulfur in the presence of a small amount of N-cyclohexyl-2-thiazole sulfenamide.

2. A vulcanizable rubber composition including rubber, sulfur and a small amount of N-cyclohexyl-2-thiazole sulfenamide.

3. A vulcanized rubber product prepared by heating rubber and sulfur in the presence of a small amount of N-cyclohexyl-2-thiazole sulfenamide.

4. The method of vulcanizing rubber which includes heating rubber and sulfur in the presence of a small amount of N-sec-amyl-2-thiazole sulfenamide.

5. A vulcanizable rubber composition including rubber, sulfur and a small amount of N-sec-amyl-2-thiazole sulfenamide.

6. A vulcanized rubber product prepared by heating rubber and sulfur in the presence of a small amount of N-sec-amyl-2-thiazole sulfenamide.

7. The method of vulcanizing rubber which includes heating rubber and sulfur in the presence of a small amount of a substance selected from the group consisting of N-cyclohexyl-2-thiazole sulfenamide and N-sec-amyl-2-thiazole sulfenamide.

8. A vulcanizable rubber composition including rubber, sulfur and a small amount of a substance selected from the group consisting of N-cyclohexyl-2-thiazole sulfenamide and N-sec-amyl-2-thiazole sulfenamide.

9. A vulcanized rubber product prepared by heating rubber and sulfur in the presence of a small amount of a substance selected from the group consisting of N-cyclohexyl-2-thiazole sulfenamide and N-sec-amyl-2-thiazole sulfenamide.

EDWARD L. CARR.
GEORGE E. P. SMITH, Jr.

References Cited in the file of this patent

UNITED STATES PATENTS

| Number | Name | Date |
| --- | --- | --- |
| Re. 19,286 | Zaucker et al. | Aug. 21, 1934 |
| 2,419,283 | Paul et al. | Apr. 22, 1947 |
| 2,445,722 | Carr et al. | July 20, 1948 |

FOREIGN PATENTS

| Number | Country | Date |
| --- | --- | --- |
| 593,748 | Great Britain | Oct. 24, 1947 |